United States Patent [19]

Ritter et al.

[11] Patent Number: 4,811,097
[45] Date of Patent: Mar. 7, 1989

[54] VIDEO SIGNAL PROCESSOR

[75] Inventors: David W. Ritter, Barto; Anthony Zortea, King of Prussia, both of Pa.

[73] Assignee: Videotek, Inc., Pottstown, Pa.

[21] Appl. No.: 114,685

[22] Filed: Oct. 29, 1987

[51] Int. Cl.$^4$ .............................................. H04N 5/14
[52] U.S. Cl. .................................... 358/160; 358/167; 358/36; 358/139; 375/13; 455/296; 333/28 R; 364/726; 364/724.01; 364/825
[58] Field of Search ................. 358/36, 160, 167, 139; 375/11, 12, 13, 118; 455/296, 306, 307; 333/28 R, 28 T; 364/572, 576, 724, 726, 825, 827

[56] References Cited

U.S. PATENT DOCUMENTS

| | | |
|---|---|---|
| 3,946,214 | 3/1976 | Stuart et al. ............... 333/28 R |
| 4,044,381 | 8/1977 | Shimano et al. ............ 358/160 |
| 4,163,258 | 7/1979 | Ebihara et al. ............. 358/167 |
| 4,430,743 | 2/1984 | Watanabe .................... 375/13 |
| 4,458,362 | 7/1984 | Berkovitz et al. .......... 333/28 T |
| 4,476,491 | 10/1984 | Murata et al. ............. 358/167 |
| 4,612,575 | 9/1986 | Ishman et al. ............. 358/167 |
| 4,635,117 | 1/1987 | Labb ......................... 358/160 |
| 4,755,879 | 7/1988 | Hinson ....................... 358/167 |

Primary Examiner—James J. Groody
Assistant Examiner—Michael D. Parker
Attorney, Agent, or Firm—Steele, Gould & Fried

[57] ABSTRACT

In one embodiment, the video signal generator outputs a standardized analog video signal. The signal generator includes a clock controlling a sequential address generator. The address generator activates a memory device that is, for example, a ROM. A distortion conditioned standardized digital video signal is stored in the ROM. This distortion conditioned signal has distortion correction characteristics matching an output filter. Following the ROM is a D to A converter that converts the conditioned digital video signal into a conditioned analog video signal. A simple filter follows the D to A converter. The filter introduces distortion into the signal applied at its input but since that signal already has distortion correction characteristics therein, the distortion correction characteristics of the input signal match and substantially cancel the distortion introduced into that signal by the filter. Therefore, a standardized analog video signal is produced at the output of the filter. The real time video signal processor, in another embodiment of the present invention, utilizes a distortion correction operator in conjunction with a memory that introduces into the digital video signal distortion correction characteristics. As with the signal generator, the distortion correction characteristics match and cancel the distortion introduced into the analog signal by the output filter.

13 Claims, 4 Drawing Sheets

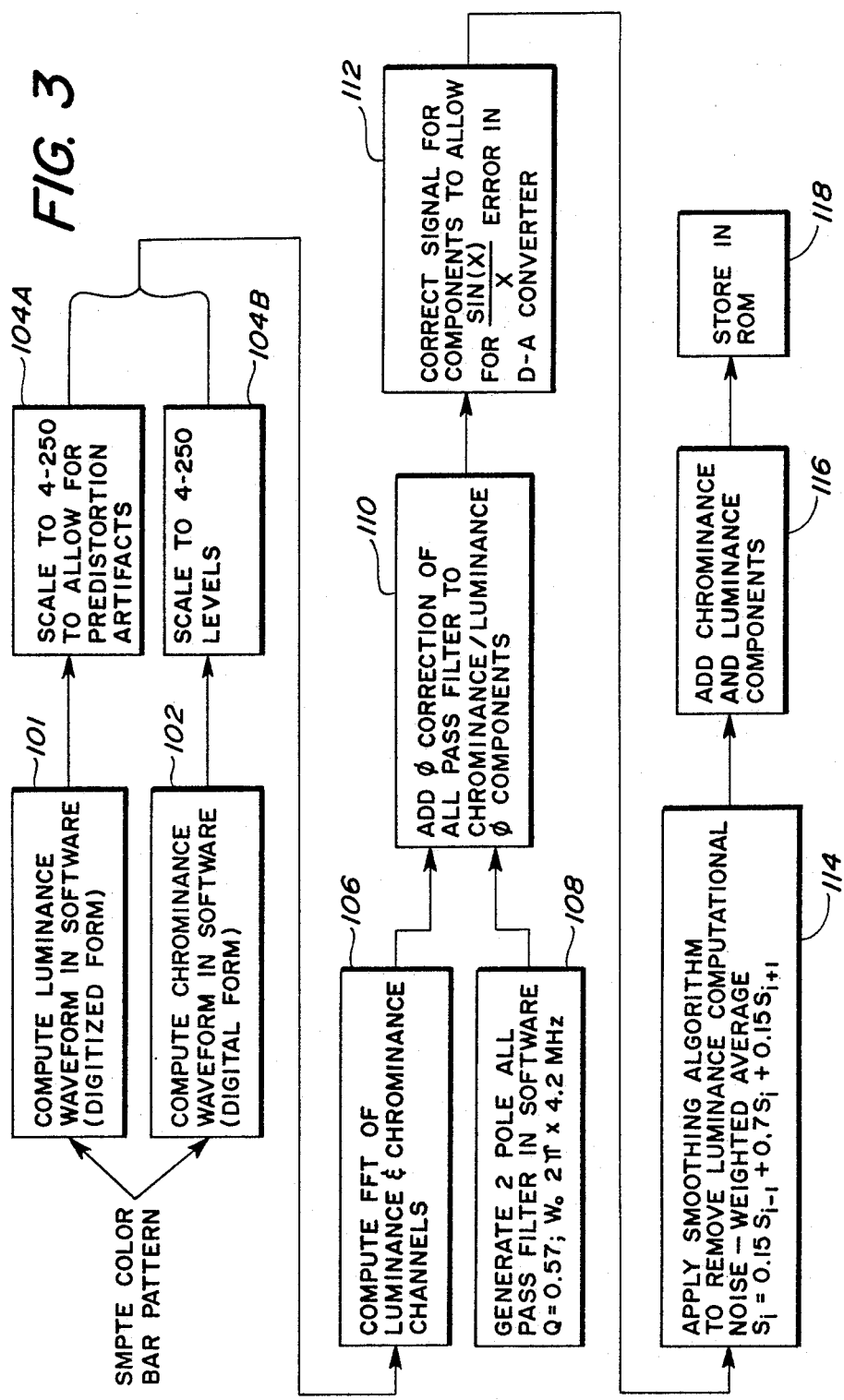

D-A OUTPUT WITH
DISTORTION CONDITIONED
SIGNAL

D-A OUTPUT WITH
STANDARDIZED SIGNAL

FILTER OUTPUT WITH
DISTORTION CONDITIONED
SIGNAL

FILTER OUTPUT WITH
STANDARDIZED SIGNAL

DETAIL OF FILTER OUTPUT
WITH DISTORTION
CONDITIONED SIGNAL

DETAIL OF FILTER OUTPUT
WITH STANDARDIZED SIGNAL

VIDEO SIGNAL PROCESSOR

BACKGROUND OF THE INVENTION

The present invention relates to a video signal processor or a processing scheme that utilizes digital techniques to obtain a distortion corrected digital signal that is ultimately converted into an idealized analog signal.

It has been established that analog signals, such as video and audio waveform signals, can be represented digitally, by a series of numbers, provided that two constraints are met. The first constraint is that the number of bits in the digital word, representing the waveform, must be sufficient to accurately describe the signal amplitude at any point in time. This constraint is met by choosing analog to digital (A to D) and digital to analog (D to A) converters with sufficient resolution. The second constraint is that the sampling rate must be equal to or greater than twice the highest frequency component of the analog signal. This second constraint is met by choosing a high enough sampling frequency.

If both these constraints are met, the signal theoretically can be reconstructed essentially unaltered. Reconstruction of a digitized signal is accomplished by first using D to A converter and then filtering the analog output of that converter.

The problem with the current state of the art is that the filter following the D to A converter must limit signals having frequencies above the one-half sampling frequency to minimal amplitudes while passing all other signal frequencies without alteration. It is difficult to construct, manufacture, design and implement such filters since the required rapid roll off of high frequency signals, i.e., the filter response, introduces significant phase distortions in the components of the analog signal. These phase distortions result in serious over shoot and ringing on transient waveforms. the traditional solution to this problem is to incorporate expensive precision phase correction filters as filter stages in the output filter following the D to A converter. These phase correction filter stages must be hand tuned to guarantee good performance and the accurate reproduction of the analog video signal.

The present invention relates to a video signal generator or a video signal processor. A video signal generator is a device which produces an idealized, standardized analog video signal at its output. This analog video signal is input into a video monitor in order to determine whether the monitor and associated equipment is correctly adjusted to reproduce the appropriate levels of luminance, chrominance, that is brightness and color of the video signal, among other things. The most critical use of the video signal generator is in the broadcast industry. As used herein, the term "standardized video signal" refers to an analog video signal representative of the SMPTE color bar signal or other idealized or test analog video signal recognized in the industry or utilized in the adjustment of video monitors by the industry or by an individual user. The claims are meant to cover such analog signals. SMPTE color bars refers to Socity of Motion Picture and Television Engineers modification (document ECR 1-1978) of EIA-RS189A. The term "video signal" refers to a base band signal and hence is not solely limited to signals utilized exclusively for visual representations. The claims appended hereto are meant to cover signals similar to video signals.

The present invention also relates to a video signal processor. Prior art devices currently process video signals in real time. Some of these prior art devices are frame synchronizer delay generators or time base correctors. These digital signal processors adjust the frame or other timing characteristics of a line, frame or field of the video signal. As will be explained later, the video signal processor in accordance with the present invention can be utilized in conjunction with digitally configured frame synchronizer devices and the time base correction devices.

In both video signal generators and the video signal processors, the video signal is, at some point, represented by a digital signal. Ultimately, this digital signal must be converted into an analog signal such that the video monitor can reproduce the analog video signal. The digital video signal is, as stated earlier, generated by an output filter following the D to A converter. This output filter, in the prior art devices is typically an 8, 10 or 12 pole filter. Generally, these filters are initially designed to limit the higher frequency signal to prescribed amplitudes (such that the higher frequencies are significantly attenuated but the lower frequency signals are passed) and the last few stages (2 or 4 poles of the filter) compensate for phase changes or distortions that occur due to the frequency limiting earlier stages of the filter. These phase correction poles or filter stages are designed as all pass frequencies. It is these filter stages, the all pass networks in the output filter, that must be tuned by hand. Therefore, the prior art output filters are expensive to design, manufacture and furthermore, expensive to incorporate within electronic equipment.

OBJECTS OF THE PRESENT INVENTION

It is an object of the present invention to provide a video signal generator that utilizes a simple output filter and a distortion conditioned standardized digital video signal.

It is a further object of the present invention to match the distortion correction characteristics of the conditioned digital video signal with the distortion introduced into the signal passing through the simple output filter.

It is a further object of the present invention to avoid the use of complex, multi-pole filters by utilizing simple filters and correcting the standardized video signal by incorporating distortion correction characteristics therein.

It is an additional object of the present invention to utilize the inexpensive, simple output filters and reduce the expense of video signal generators by using a memory (e.g., ROM) storing a distortion conditioned standardized digital video signal that is matched to the distortion of the output filter. Hence, the filter need not be tuned by hand but rather the distortion is compensated for by the stored signal. Therefore, the signal generator is easier to manufacture due to the repeatability and tolerances of the filter and ROM stored signal.

It is another object of the present invention to provide a real time video signal processor that utilizes one or more digital filters to produce a distortion conditioned digital video signal that has distortion correction characteristics matching the output filter following the D to A converter.

It is another object of the present invention to provide the video signal processor that can be utilized in conjunction with other signal processors such as frame synchronizers and time base correctors.

SUMMARY OF THE INVENTION

In one embodiment, the video signal generator outputs a standardized analog video signal. The signal generator includes a clock controlling a sequential address generator. The address generator activates a memory device that is, for example, a ROM. A distortion conditioned standardized digital video signal is stored in the ROM. This distortion conditioned signal has distortion correction characteristics matching an output filter. Following the ROM is a D to A converter that converts the conditioned digital video signal into a conditioned analog video signal. A simple filter follows the D to A converter. The filter introduces distortion into the signal applied at its input but since that signal already has distortion correction characteristics therein, the distortion correction characteristics of the input signal match and substantially cancel the distortion introduced into that signal by the filter. Therefore, a standardized analog video signal is produced at the output of the filter. The real time video signal processor, in another embodiment of the present invention, utilizes a distortion correction operator in conjunction with a memory that introduces into the digital video signal distortion correction characteristics. As with the signal generator, the distortion correction characteristics match and cancel the distortion introduced into the analog signal by the output filter.

BRIEF DESCRIPTION OF THE DRAWINGS

Further objects and advantages of the present invention can be found in the detailed description of the preferred embodiments when taken in conjunction with the accompanying drawings in which:

FIG. 3 is a flow chart of the ROM signal generation algorithm;

DETAILED DESCRIPTION OF THE PREFERRED EMBODIMENTS

The present invention relates to a signal processor which is, in one embodiment, a video signal generator and which is, in another embodiment, a real time video signal processor.

Figure 1:
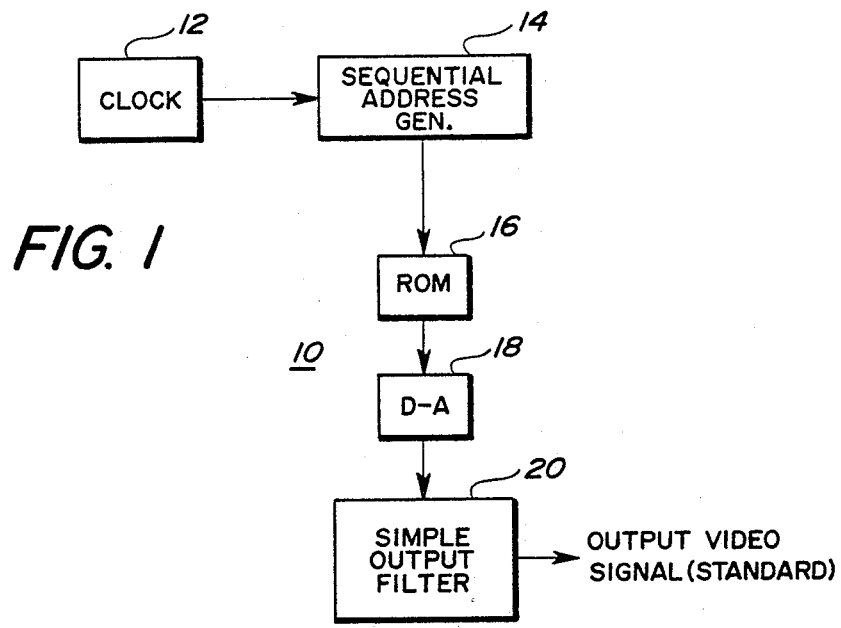
FIG. 1 illustrates, in block diagram form, the video signal generator in accordance with the present invention.

FIG. 1 illustrates, in block diagram form, a video signal generator 10. The video signal generator includes a clock 12 that operates to control sequential address generator 14. The clock and the address generator form a controller for a memory device 16. In FIG. 1, memory device 16 is a read only memory (ROM). However, memory device 16 could be a ROM, RAM, EPROM, or other type of means for storing a digital signal.

The digital signal stored in memory device 16 is a distortion conditioned, standardized digital video signal. This distortion conditioned signal has distortion correction characteristics therein that are unique to the output filter 20 that is coupled to a digital to analog (D to A) converter 18. The output of memory device 16 is coupled to D to A converter 18. Therefore, the distortion conditioned standardized digital video signal is converted to a distortion conditioned standardized analog video signal by D to A converter 18. The output of D to A converter 18 is coupled to simple output filter 20. Since output filter 20 is not as complex as prior art devices, the filter is a simple 6 pole filter as compared with prior art devices that are customarily 8, 10 or 12 pole filters.

It is known in the art that this simple filter introduces distortion into signals that pass therethrough. The filter's purpose is to limit the high frequency components of the signal above the ½ sampling frequency of the D to A converter. Due to this frequency limiting characteristic of the filter, the phase of the various signal components changes as those components pass through the filter. Therefore, conventionally, such a simple filter would need additional filter stages to correct the phase. These additional filter stages are not utilized in filter 20 because the analog signal applied to the input of filter 20 is already distortion conditioned. Lastly, due to the distortion conditioning of the video signal, the output video signal from filter 20 is a standardized or ideal analog video signal. For example, a color bar video signal could be generated as a standardized signal, a cross hatch array could be generated or other type standardized or customized video dependent upon the ultimate end use of that information bearing signal.

Figure 2:
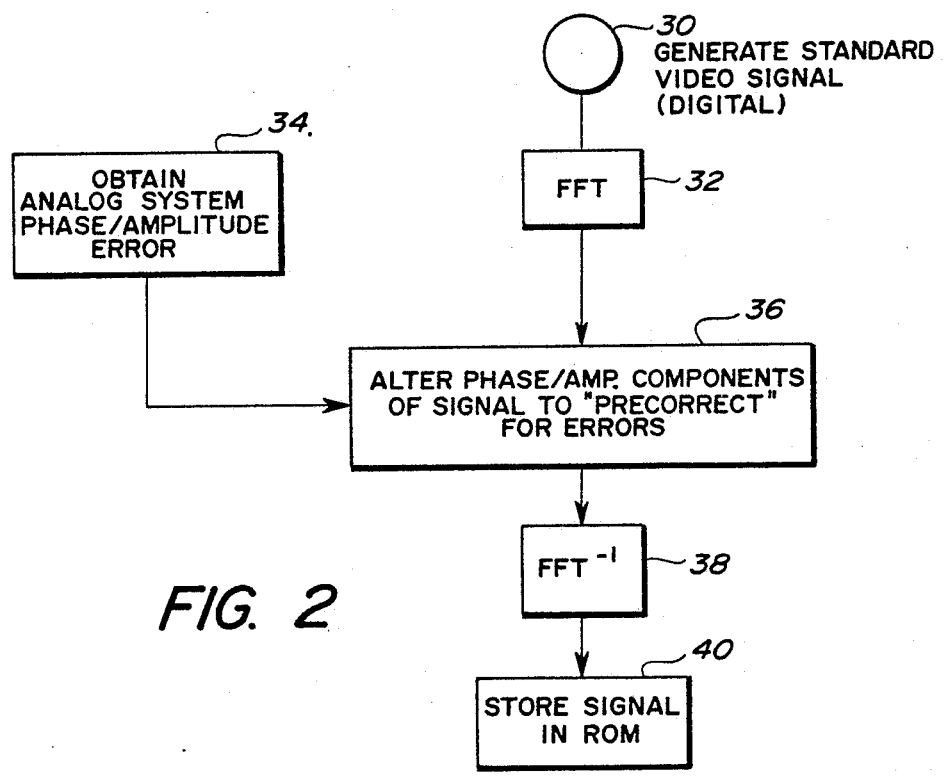
FIG. 2 illustrates, in flow chart-like form, the steps involved in producing and storing the distortion conditioned standardized video signal in a memory.

FIG. 2 illustrates, in flow chart-like form, the steps necessary to obtain the distortion conditioned standardized digital video signal. Initially, a standardized digital video signal is generated in step 30. The standardized digital video signal is transformed by a mathematical operation into a series of mathematical waveform representative functions. For example, in the embodiment shown in FIG. 2, the standardized digital video signal is transformed using a fast Fourier transformation (FFT) in step 32.

Step 34 obtains from the output filter 20 in FIG. 1 the phase and amplitude errors. This step can be done by machine or by a person analyzing the filter. This type of analysis can be implicit or explicit. Explicit considerations can be that the manufacturer of the filter provides this information to the designer. An implicit analysis involves reviewing the various filter stages in the filter and determining the group delayed distortions and overshoot and ring problems as time domain operations. Thereafter, in step 36, the Fourier transforms of the digital video signal are altered to make the distortion condition digital video signal.

It is known that one can alter the Fourier transform of the standardized video signal in order to distortion condition that signal such that when the analog representation of the video signal passes through the analog filter, the distortion correction characteristics inherent in the video signal cancel and match the distortion introduced into any signals passing through the filter. Step 38 involves applying an inverse Fourier transform to the distortion conditioned standardized digital video signal. Step 40 involves inputting the distortion conditioned signal into a memory device which, in this case, a ROM. Therefore, the present invention digitally models the converse of the analog distortion characteristics of the output filter 20, and compensates for the phase and amplitude errors by "pre-distorting" or imposing distortion correction characteristics into a signal upstream of the analog filter.

As an example of how the ROM signal is generated, the following is presented. Luminance and chrominance components are computed by generating formula for the appropriate waveforms as per SMPTE specification ECR 1-1978 and evaluating these every 70 nSec for 910 samples. Since FFT processing requires $2^N$ samples, $(1024-910=)$ 114 samples (set=0) are added to the end of each video line. Luminance risetimes are $\sin^2$ shaped with 140 nSec risetimes. Chrominance envelopes have 300 nSec, $\sin^2$ envelope risetimes. Chrominance waveform is the product of a unit amplitude sinusoid with a period of 4 samples and the envelope computed as per above sepecification. The starting phase of the sinusoid is also specified as a phase offset from the 0 degree burst signal. 0 degrees is defined relative to the 50% edge of the horizontal sync signal.

Scaling is done to convert from the $=40$ to $+100$ IRE amplitude specifications to the 0-255 range of the 8 bit system. The signal is scaled somewhat less than the full 0-255 range to allow for the slightly larger signal excursions that the predistortion will generate.

It is known that for the type of simple 6 pole filter used here, a phase correction can be accomplished by using a 2 pole all pass filter having an appropriate Q and $\omega_o$. In this case, the 2 pole all pass filter has a transfer function of:

$$H(S) = \frac{S^2 - \frac{\omega_o}{Q} S + \omega_o^2}{S^2 + \frac{\omega_o}{Q} S + \omega_o^2}$$

With values of $\omega_o = 2\pi \times 4.2$ MHz and $Q=0.57$. These values were chosen for best luminance edge shaping. This transfer function is directly translatable (via complex algebraic manipulation) to Fourier phase coefficients.

A smoothing algorithm is applied to remove computational noise and is of the form of a weighted moving average. If $\hat{S}_i$ is the new signal value, $S_i$ the old signal value, $S_{i-1}$ and $S_{i+1}$ the previous and next values respectively then $$\hat{S}_i = 0.15 S_{i-1} + 0.7 S_i + 0.15 S_{i+1}$$

Chrominance and Luminance signals are created and processed separately to avoid intermodulation products that occur during manipulation. The particular filter being corrected in this case is a 6th order Butterworth, witha transfer function given by:

$$H(S) = \frac{S^6}{(S^6 + 1.21 \times 10^8 S^5 + 7.37 \times 10^{15} S^4 + 2.83 \times 10^{23} S^3 + 7.27 \times 10^{30} S^2 + 1.18 \times 10^{34} S + 9.614 \times 10^{44})}$$

FIG. 3 is a flow chart of the ROM signal generation algorithm. The SMPTE color bar pattern specifications are input into steps 101 and 102. The luminance and chrominance waveforms are separately manipulated due to the occurrence of intermodulation products when those signals are treated together. Hence, although the flow chart shows single channel manipulation when the fast Fourier transform is taken, it is understood that the luminance and chrominance signal channels are in fact processed spearately until they are combined in the step immediately prior to storage in the ROM.

Steps 104a and 104b scale the waveform data into 4 to 250 levels. Since an 8 bit machine is used, 0 to 255 levels are available but some signal levels must be left to accommodate the distortion conditioning components of the signal. These are called "predistortion artifacts" in FIG. 3. Step 106 computes the fast Fourier transform of the two signal channels. Step 108 models in software the 2 pole all pass filter sought to be eliminated. Step 110 adds phase correction to correct for the filter distortions to the phase components of the transformed luminance and chrominance signal channels. Step 112 inserts further corrections to the signal channels for amplitude errors of the D to A converter. These are sin(x) divided by x errors.

Step 114 smoothes the signals with an appropriate weighted moving average algorithm as discussed above. This reduces computational noise. Step 116 combines the chrominance and luminance signal channels together and step 118 stores these signals in ROM.

Figure 4A:
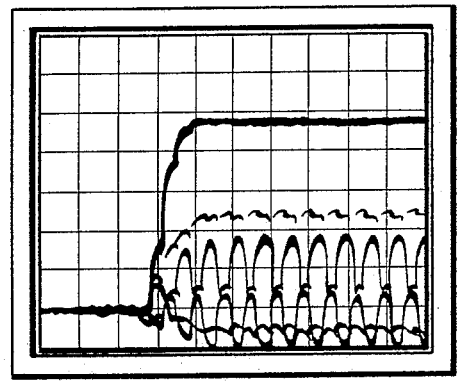
FIGS. 4A through 4F represent oscilloscope tracings of SMPTE color bar responses.
Figure 4B:
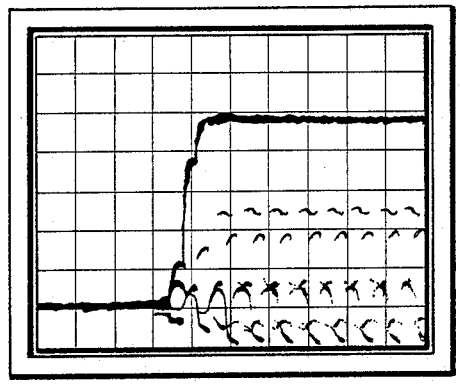
Figure 4C:
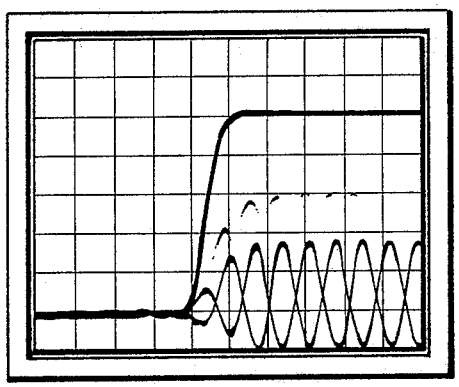
Figure 4D:
Figure 4E:
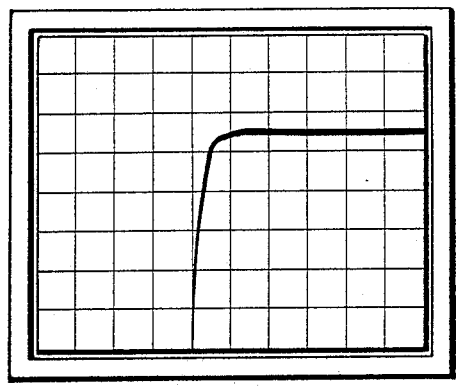
Figure 4F:
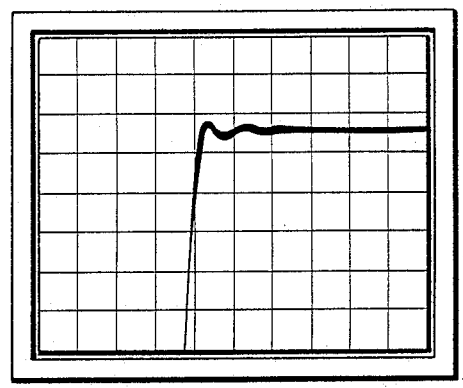

FIGS. 4A through 4F show oscilloscope tracings for the SMPTE color bar response at the gray bar luminance edge. FIGS. 4A and 4B, respectively, show the D to A output with a predistorted signal for ROM and with an ideal signal from ROM. FIGS. 4C and 4D, respectively, show the filter output (the filter described above) with a distortion condition (predistorted) signal and with an ideal analog video signal. FIGS. 4E and 4F show a detail of the filter outputs shown in FIGS. 4C and 4D, respectively, and prove that the overshoot, present when using the ideal or standardized analog video signal with the 6 pole filter, is removed when using the predistorted or distortion conditioned analog video signal.

Figure 5:
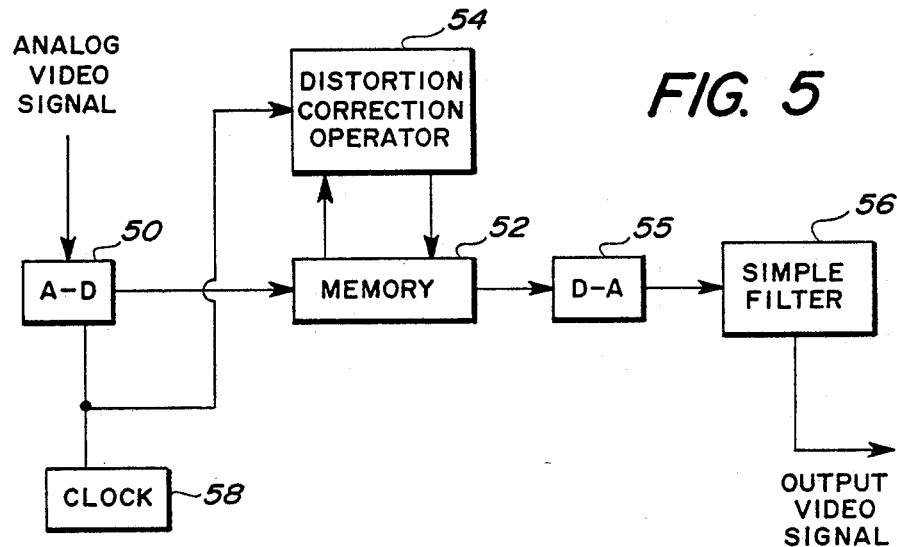
FIG. 5 illustrates, in block diagram form, the real time video signal processor.

FIG. 5 shows, in block diagram form, a real time video signal processor. An analog video signal is applied to A to D converter 50. The analog video signal is converted into digital from and applied to memory 52. A distortion correction operator 54 initially obtains a cluster or group of the digital representations of the signal, and based upon the characteristics of simple output filter 56 downstream of memory 52, introduces into the digital video signal distortion correction characteristics. Thereafter, distortion correction operator 54 stores the distortion conditioned digital video signal back into memory 52. The output of memory 52 is applied to D to A converter 55. The output of D to A converter 55 is coupled to simple filter 56 and an analog output video signal is generated at the output of the filter. The A to D converter 50, D to A converter 55 and distortion correction operator 54 are coupled in some manner to a clock 58 such that their operation is synchronized to the overall digital processing system.

Distortion correction operator 54 is a dedicated signal processor. Operator 54 includes one or more finite impulse response (FIR) digital filters that alter the digital video signal. The Fourier transforms utilized to obtain the distortion conditioned standard digital video signal, are used to construct the finite impulse response digital filters in correction operator 54. These Fourier transforms are changed into the time domain in order to implement the finite impulse response filters directly. These impulse response filters are digital convolutions of the inverse Fourier transforms of the phase and/or amplitude correction functions.

Distortion correction operator 54 is done in real time. The real time video signal processor can be operated in conjunction with frame sync devices and time base correctors. For example, it is known that some prior art devices include frame sync devices that synchronize the frame in a particular video signal to an overall sync signal. Also, it is known that some digital processors utilize time base correctors to synchronize lines, frames or fields of the video signal. These frame sync devices and time base correctors are used in addition to distortion correction operator 54 and operate in conjunction with memory 52. For example, a time base corrector can sample a signal in oanother part of the circuit, sample the flow of signals through memory 52 either before or after the introduction of the distortion correction characteristics and add a delay line or other such digital process in addition to correction operator 54 such that the output from memory 52 is delayed. Otherwise, an additional digital circuit can be interposed between memory 52 and D to A converter 55. In any event, the digital processing in these prior art circuits must include a D to A converter and an output filter to convert the signal and remove the higher frequencies in the converted signal.

In all these embodiments, the video signal generator illustrated in FIG. 1 and the video signal processor illustrated in FIG. 5, the distortion conditioned signal is further conditioned to remove certain amplitude errors that may be introduced by the output filters. For example, in an 8 bit system, some type of smoothing is incorporated in the conditioned digital signal which reduces small amplitude distortions in the output signal. A moving average type digital filter is incorporated in distortion correction operator 54 to accomplish this. The smoothing operation is done by heuristic techniques. Such correction is also incorporated in the digital signal stored in ROM 16 in the signal generator of FIG. 1.

The claims appended hereto are meant to cover modifications and changes of the overall invention. For example, the memory can be any type of digital storage memory. Other types of mathematical algorithms can be applied to obtain the distortion conditioned video signal. The claims are meant to cover these and other modifications and changes.

What is claimed is:

1. A video signal generator for generating a standardized video signal in analog form comprising:
    controller means;
    means for storing a distortion conditioned standardized digital video signal having distortion correction characteristics, said means for storing coupled to and controlled by said controller means to output said conditioned standardized video signal;
    a digital to analog converter means for receiving said conditioned standardized video signal and for converting the same into a distortion conditioned analog signal representative thereof;
    a filter means for receiving said conditioned analog signal and for filtering the same;
    wherein said filter means introduces distortion into said conditioned analog signal and wherein said distortion correction characteristics of said distortion conditioned standardized video signal substantially match and cancel the distortion introduced by said filter means thereby producing said standardized analog video signal at an output of said filter means.

2. A video signal generator as claimed in claim 1 wherein said distortion introduced by said filter means is a phase distortion of said analog signal and said distortion correction characteristics cancel said phase distortion.

3. A video signal generator as claimed in claim 2 wherein said filter means is a six pole filter.

4. A video signal generator as claimed in claim 1 wherein said means for storing is a read only memory device.

5. A real time video signal processor for processing an analog video signal comprising:
    an analog to digital converter means for converting said analog video signal into a representative digital video signal;
    means for introducing into said digital video signal distortion correction characteristics and producing a distortion conditioned digital video signal;
    a digital to analog converter means for converting said distortion conditioned digital video signal and producing a representative distortion conditioned analog video signal;
    a filter means for receiving said distortion conditioned analog video signal and for filtering the same;
    wherein said filter means introduces distortion into said conditioned analog signal and wherein said distortion correction characteristics of said distortion conditioned video signal match and cancel the distortion introduced by said filter means thereby producing said analog video signal at an output of said filter means.

6. A real time video signal processor as claimed in claim 5 wherein said means for introducing includes a memory means for storing said digital signal, a means for dynamically modifying said stored digital analog signal and incorporating said distortion correction characteristics therein, and means for outputting the distortion conditioned video signal from said memory means.

7. A real time video signal processor as claimed in claim 5 wherein said memory means is a digital storage device.

8. A real time video signal processor as claimed in claim 6 wherein said means for modifying is at least one digital finite impulse response filter.

9. A method of producing a standardized, analog video signal via a filter that introduces a substantially known distortion into analog video signals passing therethrough comprising the steps of:
    obtaining distortion correction factors for said filter based upon said known distortion;
    generating a standardized, digital video signal;
    transforming said standardized digital video signal, with a known mathematical operation, into a series of mathematical waveform representative functions;
    modifying said waveform representative functions to correspond to said distortion correction factors;
    inversely transforming the modified waveform representative functions to obtain a distortion conditioned standardized digital video signal;
    storing said distortion conditioned standardized digital video signal;
    converting said distortion conditioned standardized digital video signal into a distortion conditioned analog video signal; and
    passing said distortion conditioned analog video signal through said filter wherein the distortion conditioning characteristics of said signal substantially cancel said known distortion of said filter thereby producing said standardized analog video signal.

10. A method of producing a standardized analog video signal as claimed in claim 9 wherein said known mathematical operation is a Fourier transform and said inverse transformation is an inverse Fourier transform.

11. A method of producing a standardized analog video signal as claimed in claim 10 wherein said storing is digital in nature.

12. A method producing a standardized analog video signal as claimed in claim 9 wherein said distortion correction factors represent correction factors for phase errors in said filter.

13. A method of producing a standardized analog video signal via a filter that introduces a substantially known distortion into analog video signals passing therethrough comprising the steps of:

generating a distortion conditioned standardized digital video signal having distortion correction characteristics that substantially match and cancel said distortion contributed to signals passing through said filter;

converting said distortion conditioned digital video signal into a distortion conditioned, standardized analog video signal;

passing said conditioned analog video signal through said filter wherein the distortion correction characteristics of the conditioned analog signal substantially match and cancel the distortion introduced therein by said filter thereby generating a substantially distortion free, standardized analog video signal.

* * * * *